(12) United States Patent
Hou

(10) Patent No.: US 6,195,747 B1
(45) Date of Patent: Feb. 27, 2001

(54) SYSTEM AND METHOD FOR REDUCING DATA TRAFFIC BETWEEN A PROCESSOR AND A SYSTEM CONTROLLER IN A DATA PROCESSING SYSTEM

(75) Inventor: Chien-Tzu Hou, Fremont, CA (US)

(73) Assignee: Mentor Arc Inc., Fremont, CA (US)

( * ) Notice: Subject to any disclaimer, the term of this patent is extended or adjusted under 35 U.S.C. 154(b) by 0 days.

(21) Appl. No.: 09/162,241

(22) Filed: Sep. 28, 1998

(51) Int. Cl.[7] .................................................. G06F 13/00
(52) U.S. Cl. ................................ 712/222; 712/7; 712/2
(58) Field of Search .............................. 712/205, 9, 218, 712/8, 1, 2, 16, 7, 222; 710/126

(56) References Cited

U.S. PATENT DOCUMENTS

| | | | |
|---|---|---|---|
| 4,760,525 | * 7/1988 | Webb ....................................... | 712/2 |
| 4,779,192 | * 10/1988 | Torii et al. ............................... | 712/8 |
| 5,123,095 | * 6/1992 | Papadopoulos et al. ............. | 712/218 |
| 5,241,631 | * 8/1993 | Smith et al. ........................... | 710/126 |
| 5,339,429 | * 8/1994 | Tanaka et al. ......................... | 712/205 |
| 5,437,043 | * 7/1995 | Fujii et al. ............................... | 712/1 |
| 5,623,685 | * 4/1997 | Leedom et al. ......................... | 712/9 |
| 5,926,642 | * 7/1999 | Favor ...................................... | 712/1 |

* cited by examiner

*Primary Examiner*—Meng-Ai T. An
*Assistant Examiner*—Jungwon Chang
(74) *Attorney, Agent, or Firm*—Townsend and Townsend and Crew LLP

(57) ABSTRACT

A system and method for reducing data traffic between the processor and the system controller in a data processing system during the execution of a vector or matrix instruction. When the processor receives an operation command requiring that a large quantity of data be processed, the processor issues a local operation request containing the desired operation, addressing information of the operands and a destination location for the result to the system. The system controller includes a local operation unit for locally executing the local operation request issued from the processor. Because the operand data associated with the operation need not be transferred over the system bus connected between the processor and the system controller, the data traffic between the processor and the system controller is reduced.

13 Claims, 4 Drawing Sheets

SYSTEM AND METHOD FOR REDUCING DATA TRAFFIC BETWEEN A PROCESSOR AND A SYSTEM CONTROLLER IN A DATA PROCESSING SYSTEM

BACKGROUND OF THE INVENTION

1. Field of the Invention

The present invention generally relates to data processing system architecture technology. More specifically, the present invention relates to a data switching device with a bandwidth management unit to reduce system data traffic between the processor and the system controller in a data processing system while performing vector-calculation operations, such as vector product operations, and the processing method employed by the data switching device.

2. Description of the Related Art

The primary value of data processing systems resides in their computing power. This computing power is useful in engineering, statistics, scientific research, and many other fields. For example, engineers use computing power to solve high-order polynomial equations, or to simulate the stress (force) distribution of an aircraft or a sailing vessel. Because most applications require a large number of computing steps, data processing systems need to quickly retrieve data to be processed and output the result of the operation. Therefore, the efficiency of data transfer is a critical factor in computing performance.

FIG. 1 (Prior Art) is a block diagram of a part of a typical data processing system, such as a computer system. FIG. 1 shows only the components of the data processing system that are required to perform a mathematical operation. As shown in FIG. 1, the data processing system comprises processor 10, system controller 20, main memory 30, peripheral device(s) 40 and cache memory 50. Co-processor 10a is an optional component, which is used to help processor 10 perform special mathematical operations, such as floating-point operations. The functions of these components are described as follows.

Processor 10 is the processing center of the data processing system, which receives instructions and sequentially executes them. In addition, processor 10 usually includes several embedded registers (not shown) that store the data to be processed and the operation result, and which serve to reduce the number of times it is necessary to communicate with external data sources. System bus 60 is connected between processor 10 and system controller 20.

System controller 20 is a bridge device for interfacing between processor 10 and other components in the data processing system, such as main memory 30 and peripheral devices 40. The main functions of system controller 20 are to manage the main memory (typically implemented by Dynamic Random Access Memories, or DRAM) and to interface between the system bus and a peripheral bus (such as a Peripheral Component Interface bus, or PCI). Briefly speaking, the memory management function of system controller 20 comprises transferring information, such as program code and data code, between processor 10 and main memory 30. In addition, system controller 20 controls peripheral devices 40, such as the input/output devices. For example, a multimedia system of peripheral devices 40 displays the result of the desired operation. The interface function of system controller 20 is irrelevant to the issue of the present invention and will not be further discussed.

Cache memory 50 and optional co-processor 10a, both of which are located in proximity to processor 10, provide processor 10 with additional assistance. Cache memory 50, typically implemented by Static Random Access Memories (SRAM), serves as a buffer space for temporarily storing the input/output data of processor 10. As described above, processor 10 includes only a limited number of embedded registers and therefore cannot pre-load all the program code that is ready to be executed. If processor 10 were required to load the program/data code instruction-by-instruction at the time of execution, it is clear that the computing speed of processor 10 would decrease. Using cache memory 50 as a buffer allows processor 10 to execute instructions without the interruptions resulting from accessing external program/data code.

Co-processor 10a, as described above, provides additional calculation functions that are not implemented by hardware in processor 10. For example, some co-processors provide processors with floating-point calculation functions, which otherwise would be fulfilled by software. Basically, co-processor 10a operates under the control of processor 10, (i.e. co-processor 10a receives operation code and data code related to the floating-point operation from processor 10), and cannot work independently. Today, many of the additional functions previously provided by co-processors have been merged into processors. Nevertheless, the modern multi-processor system is similar in architecture to that of a processor/co-processor system, although more complicated.

According to the above description, the process for performing a mathematical operation in the data processing system as shown in FIG. 1 is briefly described as follows. In the following example, the operands (data ready to be processed) are stored in main memory 30. After receiving an instruction for adding operand X with operand Y, processor 10 issues a read request for reading the data X and Y to system controller 20 through system bus 60. System controller 20 reads out the data X and Y stored in main memory 30 in response to the read request received from processor 10 and sends the data back to processor 10 through system bus 60. After finishing the addition operation, processor 10 then issues a write request for writing the addition result to main memory 30. This write request is also transferred by system bus 60. Finally, system controller 20 receives the write request and writes the addition result to a destination location in main memory 30. The addition operation is completed.

It is evident that system bus 60 is quite busy. In the above calculation, processor 10 issues, through system bus 60, the read request containing the addressing information of operands X and Y, and the write request containing the result data and the addressing information of the result data. In fact, the data traffic of system bus 60 is heavier than that of other buses. As described above, system controller 20 is electrically coupled to, and transfers data between, processor 10, main memory 30, PCI bus and graphic subsystem 40. Therefore, data from various sources that is ready to be processed is transferred to processor 10 through system bus 60, thereby increasing the data traffic on system bus 60. One could describe system bus 60 as a bottleneck in the system performance. Many methods have been proposed to solve this problem. For example, the data processing system can use the Direct Memory Access (DMA) technique to bypass the graphic data required in the display system, and add a controller to directly control the operation of the peripheral devices. However, information associated with mathematical operations must pass through system bus 60 (in order to be executed by processor 10) and cannot be rerouted to other components. Mathematical operations requiring a lot of data, such as vector or matrix operations, have an especially great impact on the traffic load of system bus 60.

FIG. 2 (Prior Art) is a data flow diagram showing the flow of data between processor 10, system controller 20 and main memory 30 during a vector multiplication operation. In FIG. 2, the data (request or control signals) sequence is denoted by symbols 1a through 1k. FIG. 2 only depicts the components relevant to this calculation process, i.e. processor 10, system controller 20 and main memory 30.

The operation illustrated in FIG. 2 is a calculation of the inner product of vector X and vector Y (that is, X·Y), wherein $X=(x_1, x_2, \ldots, x_n)$, $Y=(y_1, y_2, \ldots, y_n)$ and n represents the dimensions of vectors X and Y. As shown in FIG. 2, a vector-calculation instruction 1a, which indicates the operation of X·Y, is first sent to processor 10. After accepting vector-calculation instruction 1a, processor 10 begins to retrieve the data of vectors X and Y and execute the vector multiplication operation.

First, processor 10 must retrieve the data of vector X. Processor 10 sends a read request 1b containing addressing information for the data of vector X to system controller 20. Then system controller 20 produces control signal 1c to access main memory 30 according to the addressing information contained in read request 1b. Data 1d, corresponding to the elements of vector X, are transmitted from main memory 30 to system controller 20. Then system controller 20 returns data 1e to processor 10. Note that data 1d and 1e each contain at least n numbers, which correspond to vector elements $x_1$ through $x_n$.

Processor 10 employs the same method to retrieve the data of vector Y. Request if contains addressing information for the data of vector Y. System controller 20 produces control signal 1g in response to the addressing information in request 1f, thereby accessing main memory 30. Data 1h and 1i contain the elements of vector Y, that is, elements $y_1$ through $y_n$. Thereby, processor 10 has acquired the data of vectors X and Y, respectively.

After performing the inner product operation and obtaining the result $R=x_0y_0+x_1y_1+x_2y_2+\ldots+X_nY_n$, processor 10 stores the result R in the destination location to which the vector-calculation instruction 1a refers. In this case, the destination location is in main memory 30. Therefore, processor 10 generates a write request 1j containing the inner product result R and transmits it to system controller 20. System controller 20, by means of the control signal 1k, writes the inner product result R to the destination location in main memory 30. Now the inner product operation is completed.

In the vector inner product calculation process described above, the operation speed is determined by the computing power of processor 10 and by the transmission speed of vectors X and Y. In this case, regardless of the computing power provided by processor 10, a large amount of data (at least 2n numbers corresponding to vectors X and Y) must be transmitted through system bus 60. Because this vector data requires a certain amount of time to flow through system bus 60, system bus 60 becomes bottlenecked, as described above. As a result, the time spent transmitting the data of vectors X and Y has a significant impact on the performance of the data processing system.

SUMMARY OF THE INVENTION

The present invention provides methods and systems for reducing the data traffic between the processor and the system controller in a data processing system. The systems and methods of the present invention also reduce the data transmission time, especially during vector or matrix mathematical operations, and improve the performance of the data processing system.

According to an aspect of the present invention, a data processing system is provided, which comprises a processor for receiving an operation command and issuing a local operation request containing the addressing information for the operands of the operation command, a memory device for storing at least one of the operands of the operation command, and a system controller coupled between the processor and the memory device for directly retrieving the operands in response to the addressing information for the operands contained in the local operation request. In particular, the system controller has a local operation unit for executing the operation command in response to the local operation request received from the processor. Therefore, the operand data of the operation does not need to be transmitted over the system bus between the processor and the system controller. Finally, the system controller sends the result to a destination location indicated by the local operation request. Typically, the destination location is a register in the processor or a location in the memory device.

The process by which a data processing system performs such an operation is briefly described as follows. First, an operation command indicating the operation is transmitted to the processor. After receiving the operation command, the processor sends a local operation request to the system controller, which includes a local operation unit for performing the operation. The local operation request contains the addressing information for the operands of the operation and a destination location for storing the result of the operation. Then the system controller retrieves the operands of the operation from the memory device in response to the local operation request, but does not return this data to the processor. Finally, the system controller executes the operation using the operands of the operation and sends the result of the operation to the destination location.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE PREFERRED EMBODIMENTS

In the following description of the specific embodiments, a vector inner product operation is selected as an exemplary computing operation to be performed. This vector inner product operation requires two vector operands, namely, vector X and vector Y, which are the same as those in the description of the prior art technology. However, it will be apparent to one skilled in the art that many other operations can be performed in a manner according to the present invention. For example, vector operations and matrix operations requiring large amounts of data are also suited to the application of the present invention.

Figure 1:
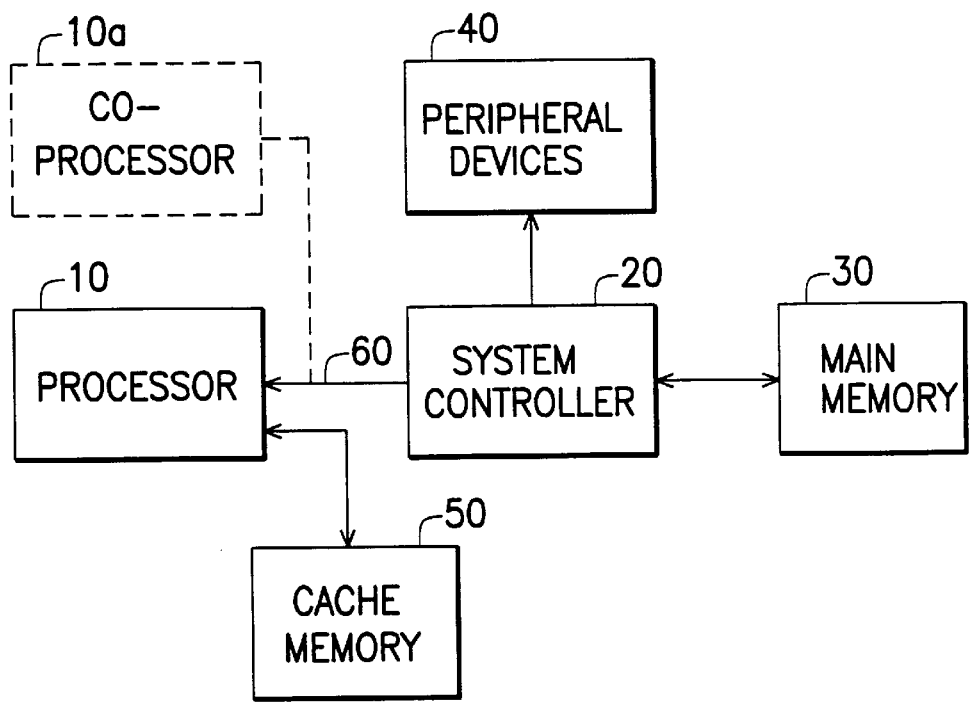
FIG. 1 (Prior Art) is a block diagram of a part of a conventional data processing system.
Figure 2:
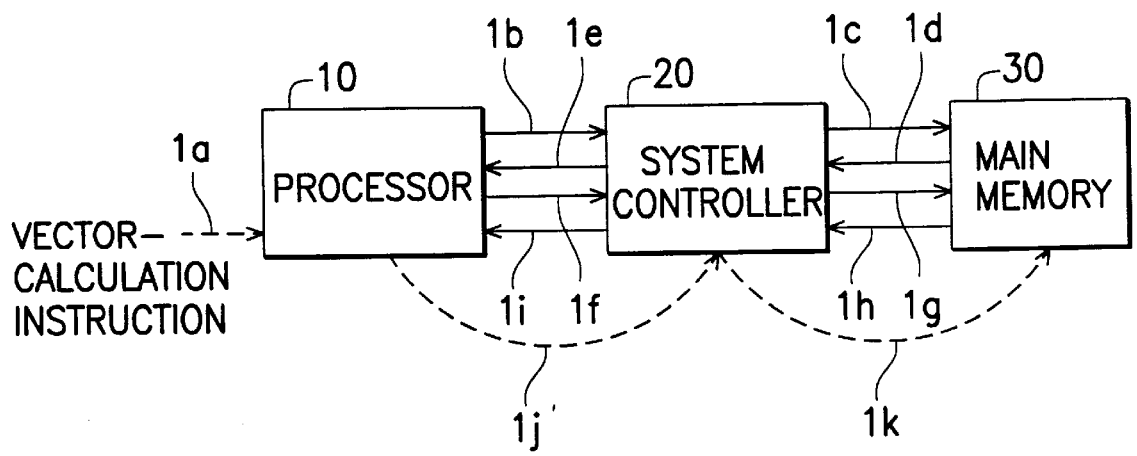
FIG. 2 (Prior Art) is a data flow diagram showing the flow of data between the processor, the system controller and the main memory while performing a vector inner product operation in a conventional data processing system.
Figure 3:
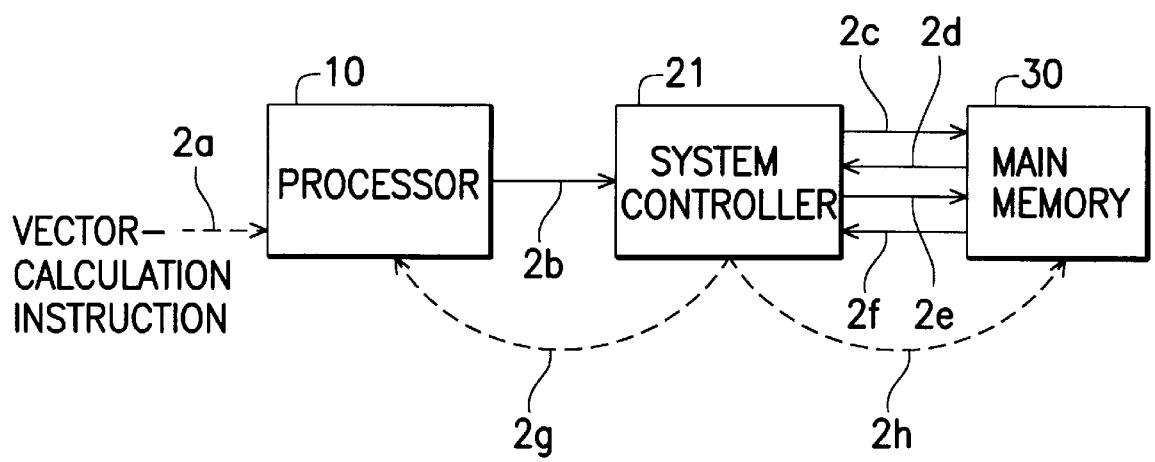
FIG. 3 is a data flow diagram showing the flow of data between the processor, the system controller and the main memory while performing a vector inner product operation according to an embodiment of the present invention.

FIG. 3 is a data flow diagram showing the flow of data between processor 10, system controller 21 and main memory 30 while performing a vector inner product operation according to an embodiment of the present invention. In FIG. 3, system controller 21 is different from system controller 20 in the prior art.

There are two main differences between the data processing systems of the present invention and the prior art. The first difference is the communication mode between processor 10 and system controller 21 (or system controller 20 in the prior art). According to one embodiment, a new control mode, called the local operation mode, is defined. When processor 10 receives an instruction associated with a vector or matrix operation requiring a large amount of data, processor 10 enables the local operation mode to make system controller 21 perform this vector or matrix operation locally. During the operation, system controller 21 does not need to send the vector or matrix operands associated with this instruction back to processor 10. Therefore, it is possible to free the system bus 60 during the period of time the instruction is being executed by system controller 21.

Another difference is the configuration of system controller 21. As described above, processor 10 activates the local operation mode to make system controller 21 perform vector or matrix operations locally. Therefore, system controller 21 requires computing power to enable it to perform vector and matrix operations. According to one embodiment, system controller 21 contains a local operation unit for performing the mathematical operation when operating in the local operation mode. When processor 10 activates the local operation mode, system controller 21, according to the information sent by processor 10, takes over the calculation steps of the operation.

First, assume that the instruction set for processor 10 has many inherent vector and matrix operations. In other words, it is possible to make processor 10 perform an operation by using a pre-defined instruction. For example, processor 10 may perform an inner (or dot) product operation (X·Y), a cross product operation (X×Y), a norm operation (norm(X)= $\sqrt{x_0^2 + x_1^2 + \ldots + x_n^2}$) and an addition operation (X+Y). The instruction set for processor 10 may assign an instruction dedicated to each of these vector operations, respectively. Among these vector operations, the operation result may be a scalar, in the case of the inner product operation and the norm operation, or a vector, in the case of the cross product operation and the addition operation. In addition, the number of operands required in the operation may be one or two. Scalar addressing is achieved using conventional addressing means, such as direct addressing, indirect addressing or index addressing, which will not be further discussed. However, one means of vector addressing will be described herein. It is evident that the inner variation between processor 10 and system controller 21 does not influence the instruction set for designing software programs. Because the original instruction set for processor 10 is still available, the program codes designed for conventional data processing systems do not need to be modified and can be directly applied to the data processing system architecture disclosed in this embodiment.

In FIG. 3, a vector-calculation instruction 2a, which in this example is a vector inner product operation, is initially fed to processor 10 to request a vector operation. The vector inner product operation requested by instruction 2a needs two operands, namely, vectors X and Y. Each vector contains n elements, that is, $X=(x_1, x_2, \ldots, x_n)$ and $Y=(y_1, y_2, \ldots, y_n)$ The data for vectors X and Y can be retrieved according to the addressing information. Generally, the data for vectors X and Y contains too many elements to be stored in the registers of processor 10. Therefore, in one embodiment, the data for vectors X and Y is stored in main memory 30 and retrieved by means of an addressing scheme, which will be described later.

Processor 10 begins to perform the vector inner product operation in response to instruction 2a. Due to the nature of the operation, processor 10 activates the local operation mode to execute instruction 2a and issues a local operation request 2b, rather than a request for reading the vector operands, to system controller 21. Local operation request 2b contains the following information: a status flag indicating whether the current request is a local operation request or not, a header for X indicating the starting address of vector X in main memory 30, a header for Y indicating the starting address of vector Y in main memory 30, a vector length indicating the number of elements in each operand, a destination location for storing the calculation result, and the required vector operation.

Upon receiving local operation request 2b, system controller 21 determines whether it is a local operation request by means of the status flag therein. In one embodiment, a normal request that does not require local operation service also contains a status flag. If the status flag reveals the current request is not a local operation request, system controller 21 will operate in a normal state. If the status reveals the current request is a local operation request, system controller 21 will operate in the local operation mode.

Figure 4:
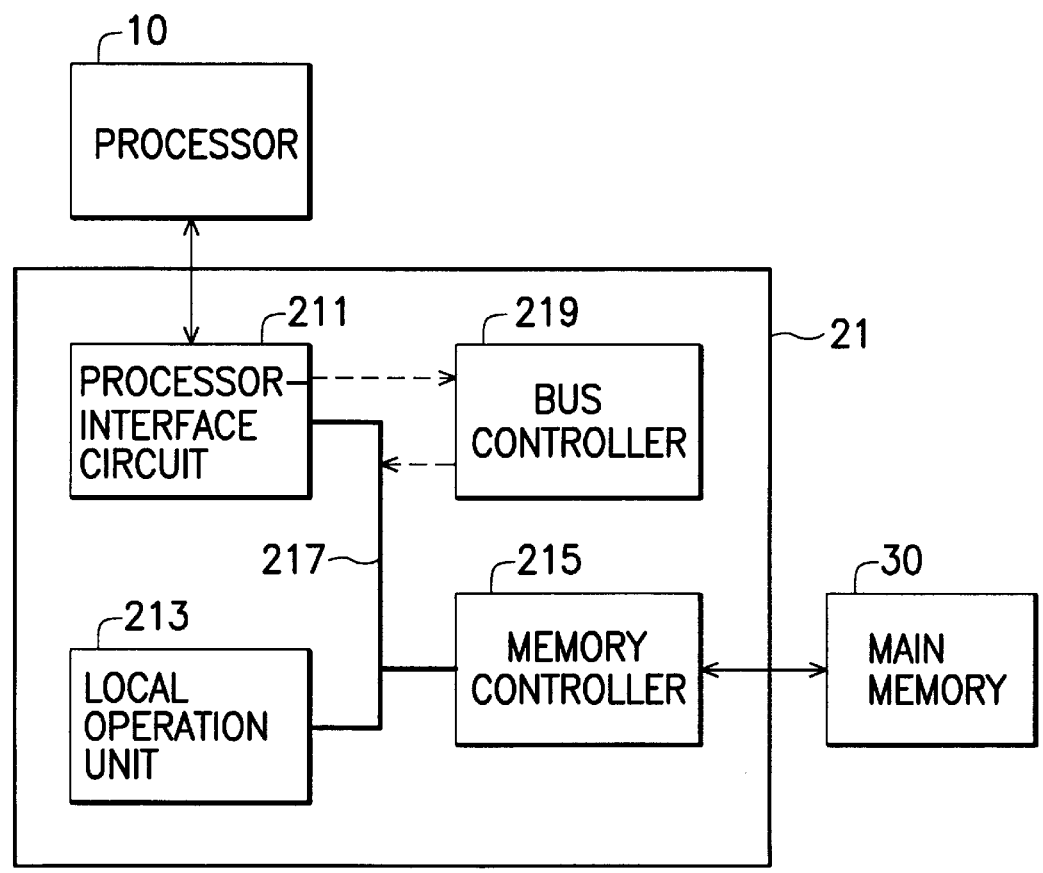
FIG. 4 is a block diagram of the system controller according to an embodiment of the present invention.

FIG. 4 is a block diagram of system controller 21 in accordance with an embodiment of the present invention. As shown in FIG. 4, system controller 21, connected between processor 10 and main memory 30, comprises processor-interface circuit 211, local operation unit 213, memory controller 215, a bus 217 for exchanging information between processor-interface circuit 211, local operation unit 213 and memory controller 215, and bus controller 219 for controlling bus 217. Other components, such as other peripheral bus controllers, are irrelevant to the present invention and are therefore not shown in FIG. 4.

Processor-interface circuit 211 is responsible for interfacing with processor 10. In other words, processor-interface circuit 211 faithfully receives any requests issued from processor 10. Memory controller 215 is responsible for interfacing with main memory 30. Memory controller 215 generates a set of control signals for accessing the physical storage locations of main memory 30 in response to a request received by processor-interface circuit 211, if the request requires that main memory 30 be accessed. In the conventional system controller, processor-interface circuit 211 receives a request to access main memory 30 and directly passes it to memory controller 215 to perform the access operation. But in the present embodiment, bus controller 219 first determines whether the request mode is the local operation mode. If it is, bus controller 219 activates the local operation mode and local operation unit 213 takes over the subsequent processing.

As described above, a request, regardless of whether it is a normal request or a local operation request, preferably contains a status flag. Note that if the status flag is encoded in the instruction format, processor-interface circuit 211 must first retrieve the status information from the encoded instruction and then pass it to bus controller 219. Bus controller 219, according to the received status flag, adjusts the mode of bus 217 if necessary.

If the received request is a normal request and requires a memory access, bus controller 219 enables the communication path between processor-interface circuit 211 and memory controller 215 and disables the communication path between processor-interface circuit 211 and local operation unit 213. If, however, the received request is a local operation request, bus controller 219 enables the communication path between processor-interface circuit 211 and local operation unit 213, as well as the communication path between local operation unit 213 and memory controller 215. In other words, in the local operation mode, the information in the request, such as the required vector operation, the headers for vectors X and Y and the vector length, are transferred from processor-interface circuit 211 to local operation unit 213. Then local operation unit 213 independently performs the requested operation. Furthermore, local operation unit 213 accesses main memory 30 through memory controller 215, for example to retrieve the data for vectors X and Y in one embodiment, during the execution process.

In one embodiment, data flow between processor-interface circuit 211, local operation unit 213 and memory controller 215 is controlled by bus controller 219. However, it is understood by those skilled in the art that the data flow control also can be performed by switches located between these elements.

Returning back to FIG. 3, system controller 21 receives local operation request 2b and begins to execute the desired vector inner product operation. According to the status flag accompanying local operation request 2b, the information in the request, such as the desired vector operation (inner product), the headers for vectors X and Y, the vector length and the destination location, passes to local operation unit 213 of system controller 21. In this case, the inner product operation requires two operands, namely, X and Y. Therefore, local operation unit 213 needs to first retrieve the data for vectors X and Y.

As shown in FIG. 3, system controller 21 (or memory controller 215 therein) produces control signals 2c and 2e in order to access the locations of main memory 30 storing the data for vectors X and Y, respectively. Main memory 30 then returns data 2d for vector X and data 2f for vector Y to system controller 21 (or local operation unit 213 therein). Thus, system controller 21 addresses the locations for storing the data for vectors X and Y by means of the headers for X and Y and the vector length.

Figure 5:
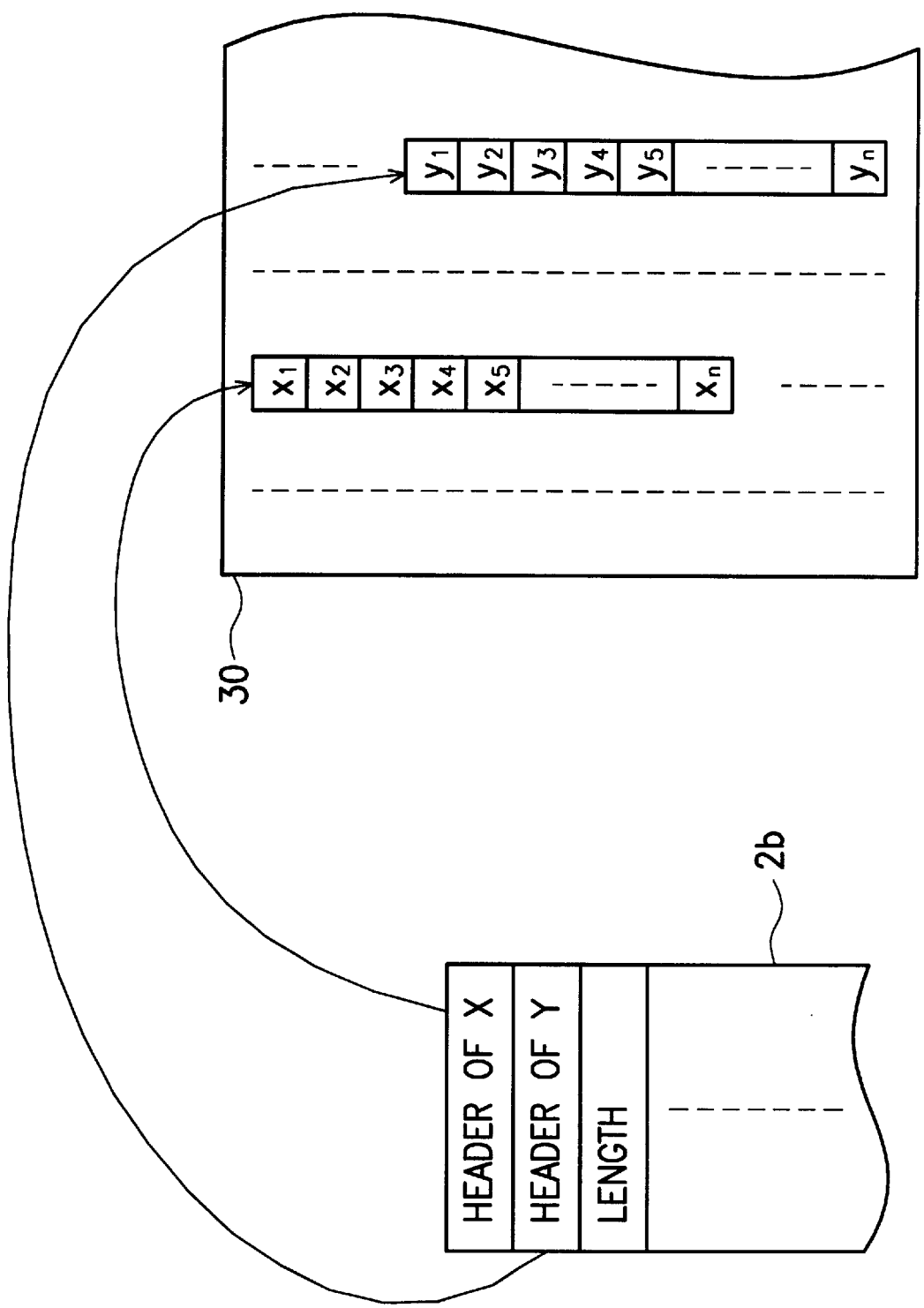
FIG. 5 is a schematic diagram showing the relationship between the information contained in the local operation request and the physical location of the data in the main memory.

FIG. 5 is a schematic diagram showing the relationship between the information contained in local operation request 2b and the physical location of the data in main memory 30. The data for local operation request 2b used in addressing the physical storage locations of the operands include the header for vector X, the header for vector Y. and the vector length. Assume that the storage locations for all elements of vector X and vector Y are continuously addressable. The header for vector X refers to the starting storage location of the first element $x_1$ of vector X. The vector length refers to the number of elements in vector X. Therefore, the data for vector X can be retrieved by using the header for vector X and the vector length, as shown in FIG. 5. In addition, the header for vector Y refers to the starting storage location of the first element $y_1$ of vector Y. Therefore, the data for vector Y can also be retrieved by using the header for vector Y and the vector length, as shown in FIG. 5.

After obtaining the data for vector operands X and Y, local operation unit 213 performs the desired vector operation. In the present example, the desired operation is the inner product operation, the calculation formula of which is expressed by $R=x_1y_1+x_2y_2+x_3y_3+ \ldots +x_ny_n$. Then local operation unit 213, according to the destination location indicated by local operation request 2b, transfers the calculation result R to the desired destination location. FIG. 3 illustrates two possibilities. The destination location may be a register of processor 10 (denoted by 2g) or a physical storage location in main memory 30 (denoted by 2h). Because the calculation result R for the inner product operation is a scalar, it is possible that the calculation result R is sent either to a register of processor 10 or a storage location of main memory 30. However, if the desired vector operation is a cross product or addition that generates a vector result, the calculation result will usually be sent to main memory 30. After finishing transmission of the result, the execution of vector-calculation instruction 2a is completed.

Figure 6:
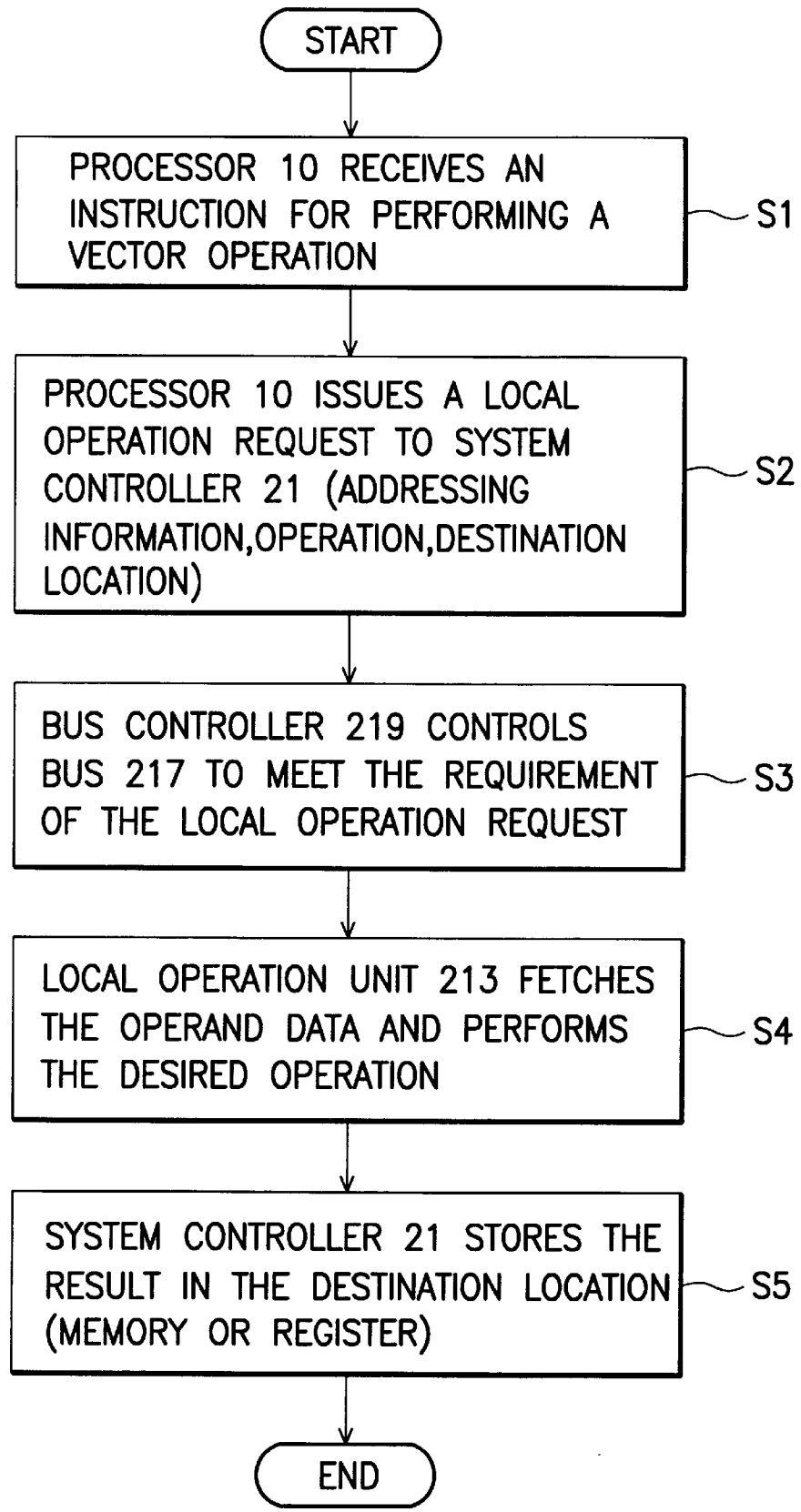
FIG. 6 is a flow chart showing in detail the steps for performing a vector operation in a data processing system in accordance with an embodiment of the present invention.

FIG. 6 is a flow chart showing in detail the steps for performing a vector operation in the above-described data processing system in accordance with an embodiment of the present invention. Other operations, such as matrix operations or statistics operations, can be performed in a similar manner. First, processor 10 receives an instruction for performing a vector operation (Step S1). At this time, processor 10 recognizes the instruction to be a vector operation and issues a local operation request to system controller 21 to activate the local operation mode (Step S2). The local operation request issued by processor 10 contains several important pieces of information. The first piece of information is the desired vector operation, such as inner product operation, cross product operation, addition operation, and so on. The second piece of information is the addressing information for retrieving the operands of the desired operation. The third piece of information is the destination location for storing the calculation result.

Upon receiving the local operation request, bus controller 219 instructs bus 217 to enable the communication paths connecting processor-interface circuit 211 to local operation unit 213 and local operation unit 213 to memory controller 215 of system controller 21 (Step S3). Then local operation unit 213 instructs memory controller 215 to retrieve the operand data and perform the desired operation (Step S4). Finally, system controller 21 stores the result of the calculation in the destination location, which may be a register in processor 10 or a location in main memory 30. Processor 10 can do other jobs during this time, thereby leaving the system bus available.

According to the above description, it is evident that only local operation request 2b needs to be transferred over the connection between processor 10 and system controller 21. It is unnecessary to transfer large quantities of vector data over the system bus. Therefore, the present invention reduces the data traffic between the processor and the system controller. In addition, the local operation unit may operate as a co-processor to reduce the processing workload of the processor.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A data processing system for performing a vector operation between vector operands comprising:

a processor for receiving an operation command and issuing a request containing an addressing information for the vector operands of the operation command;

a memory device for storing at least one of the vector operands of the operation command; and a system controller, coupled between the processor and the memory device, for directly retrieving the vector operands from the memory in response to the information contained in the request, the system controller having a local operation unit for executing the operation command when the request received from the processor is a local operation request without sending the retrieved vector operands back to the processor;

wherein the request contains a status flag in the form of instruction to indicate whether the request is a normal request or a local operation request, and if the received request is the normal request and require a memory access, enabling the communication path between the processor and memory, and disabling the communication path between a processor and local operation unit, and if the received request is the local operation request, enabling the communication path between a processor and local operation unit.

2. The data processor system of claim 1, wherein the local operation request further contains information indicating a destination location to which the local operation unit sends the result of the execution of the operation command.

3. The data processing system of claim 2, wherein the destination location is a register in the processor.

4. The data processing system of claim 2, wherein the destination location is a location in the memory device.

5. A data processing system for performing a vector operation between a first vector operand and a second vector operand in response to an operation command, the system comprising:

a processor for receiving the operation command and issuing a local operation request containing information indicating storage locations of the first vector operand and the second vector operand, and the vector operation;

a memory device for storing at least one of the first vector operand and the second vector operand; and a system controller, coupled between the processor and the memory device, for retrieving the first vector operand and the second vector operand in response to the location information contained in the local operation request, the system controller having a local operation unit for executing the vector operation of the first vector operand and the second vector operand in response to the local operation request received from the processor;

wherein the locations of the first vector operand and the second vector operand are represented by a first header indicating a starting location for the first vector operand, a second header indicating a starting location for the second vector operand, and a length indicating the dimensions of both the first vector operand and the second vector operand.

6. The data processor system of claim 5, wherein the local operation request further contains information indicating a destination location to which the local operation unit sends the result of the execution of the vector operation between the first vector operand and the second vector operand.

7. The data processing system of claim 6, wherein the destination location is a register in the processor.

8. The data processing system of claim 6, wherein the destination location is a location in the memory device.

9. A method for executing an operation in a data processing system, the data processing system having a processor, a memory device and a system controller coupled therebetween, the method comprising the steps of:

transmitting an operation command indicating the operation to the processor;

sending a local operation request from the processor to the system controller, the system controller having a local operation unit for performing the operation, the local operation request containing the addressing information for the operands of the operation and a destination location for storing the result of the operation;

wherein the request contains a status flag in the form of instruction format to indicate whether the request is a normal request or a local operation request, and if the received request is the normal request and require a memory access, enabling the communication path between the processor and memory, and disabling the communication path between a processor and local operation unit, and if the received request is the local operation request, enabling the communication path between a processor and local operation unit;

retrieving the operands of the operation from the memory device to the system controller in response to the local operation request;

executing the operation using the operands of the operation in the system controller; and storing the result of the operating to the destination location contained in the local operation request.

10. The method of claim 9, wherein the operation is a vector operation between two vector operands.

11. The method of claim 9, wherein the operation is a matrix operation between two matrix operands.

12. The method of claim 9, wherein the destination location is a register in the processor.

13. The method of claim 9, wherein the destination location is a location in the memory device.

* * * * *